(12) United States Patent
Parkinson (10) Patent No.: US 12,327,560 B2
(45) Date of Patent: Jun. 10, 2025

(54) VOICE COMMAND SCRUBBING

(71) Applicant: RealWear, Inc., Vancouver, WA (US)

(72) Inventor: Christopher Iain Parkinson, Richland, WA (US)

(73) Assignee: RealWear, Inc., Vancouver, WA (US)

( * ) Notice: Subject to any disclaimer, the term of this patent is extended or adjusted under 35 U.S.C. 154(b) by 24 days.

(21) Appl. No.: 18/504,312

(22) Filed: Nov. 8, 2023

(65) Prior Publication Data

US 2024/0079009 A1 Mar. 7, 2024

Related U.S. Application Data

(63) Continuation of application No. 17/060,579, filed on Oct. 1, 2020, now Pat. No. 11,848,015.

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01)

(58) Field of Classification Search
CPC ....... G10L 15/22; G10L 15/08; G11B 27/036; G11B 27/28
See application file for complete search history.

(56) References Cited

U.S. PATENT DOCUMENTS

| | | | |
|---|---|---|---|
| 5,954,834 A * | 9/1999 | Hassan | G10L 19/012 714/747 |
| 8,274,571 B2 | 9/2012 | Zhu | |
| 8,767,035 B2 * | 7/2014 | Baldwin | G10L 15/22 348/14.03 |
| 9,530,410 B1 | 12/2016 | Lebeau et al. | |
| 9,544,491 B2 | 1/2017 | Pryszo et al. | |
| 9,548,053 B1 | 1/2017 | Basye et al. | |
| 9,584,774 B2 | 2/2017 | Bekiares et al. | |
| 9,691,378 B1 | 6/2017 | Meyers et al. | |
| 9,728,188 B1 | 8/2017 | Rosen et al. | |
| 10,152,966 B1 | 12/2018 | O'Malley et al. | |

(Continued)

OTHER PUBLICATIONS

EP Communication received for European Application No. 21876499.1, mailed on Sep. 24, 2024, 1 page.

(Continued)

*Primary Examiner* — Brian L Albertalli
(74) *Attorney, Agent, or Firm* — SHOOK, HARDY & BACON L.L.P.

(57) ABSTRACT

The invention is directed towards a an audio scrubbing system that allows for scrubbing recognized voice commands from audio data and replacing the recognized voice commands with environment audio data. Specifically, as a user captures video and audio data via a HMD, audio data captured by the HMD may be processed by an audio scrubbing module to identify voice commands in the audio data that are used for controlling the HMD. When a voice command is identified in the audio data, timestamps corresponding to the voice command may be determined. Filler audio data may then be generated to imitate the environment by processing at least a portion of the audio data by a neural network of a machine learning model. The filler audio data may then be used to replace the audio data corresponding to the identified voice commands, thereby scrubbing the voice command from the audio data.

20 Claims, 8 Drawing Sheets

(56) References Cited

U.S. PATENT DOCUMENTS

| | | | |
|---|---|---|---|
| 10,313,417 | B2 | 6/2019 | Chen et al. |
| 10,354,651 | B1 | 7/2019 | Yi et al. |
| 10,395,428 | B2 | 8/2019 | Stafford et al. |
| 10,477,158 | B2 | 11/2019 | Galvin et al. |
| 10,489,887 | B2 | 11/2019 | El-Khamy et al. |
| 11,373,686 | B1 * | 6/2022 | Gilmour ............... H04N 23/66 |
| 2007/0256105 | A1 | 11/2007 | Tabe |
| 2008/0221882 | A1 | 9/2008 | Bundock et al. |
| 2009/0060207 | A1 | 3/2009 | Barry et al. |
| 2011/0228925 | A1 | 9/2011 | Birch |
| 2012/0020490 | A1 | 1/2012 | Leichter |
| 2012/0050012 | A1 | 3/2012 | Alsina et al. |
| 2013/0044893 | A1 | 2/2013 | Mauchly et al. |
| 2013/0266127 | A1 | 10/2013 | Schachter et al. |
| 2014/0350926 | A1 | 11/2014 | Schuster et al. |
| 2016/0127691 | A1 | 5/2016 | Bokowski et al. |
| 2017/0084276 | A1 | 3/2017 | Lebeau et al. |
| 2017/0256271 | A1 | 9/2017 | Lyon et al. |
| 2019/0073090 | A1 | 3/2019 | Parkinson et al. |
| 2019/0253611 | A1 | 8/2019 | Wang et al. |
| 2019/0267010 | A1 | 8/2019 | Li et al. |
| 2019/0307313 | A1 | 10/2019 | Wade |

OTHER PUBLICATIONS

Extended European Search Report received for European Application No. 21876499.1, mailed on Sep. 5, 2024, 8 pages.

Cybulska, M., et al., "Structure of pauses in speech in the context of speaker verification and classification of speech type", EURASIP Journal on Audio, Speech, and Music Processing, pp. 1-16 (2016).

International Preliminary Report on Patentability received for PCT Patent Application No. PCT/US2021/052935, mailed on Apr. 13, 2023, 12 pages.

International Search Report and Written Opinion received for PCT Patent Application No. PCT/US2021/052935, mailed on Jan. 10, 2022, 19 pages.

Patel, Z., "Image Segmentation Approach for Realizing Zoomable Streaming HEVC Video", Master of Science in Electrical Engineering, p. 74 (May 2015).

Watkins, N., "A modest proposal to prevent false triggers on voice assistants", Retrieved from Internet URL :https://towardsdatascience.com/a-modest-proposal-for-voice-assistants-91ee48ed1325, accessed on Jan. 25, 2021, p. 9 (Feb. 6, 2019).

* cited by examiner

VOICE COMMAND SCRUBBING

CROSS REFERENCE TO RELATED APPLICATIONS

The present application is a continuation of and claims priority from U.S. application Ser. No. 17/060,579 filed Oct. 1, 2020, entitled "Voice Command Scrubbing", which is hereby incorporated by reference in its entirety.

BACKGROUND

Users of voice activated head-mounted computing devices—such as head mounted displays (HMDs)—often use the head-mounted computing devices to record video and audio data via sensors in the head-mounted computing device. For example, a user wearing a HMD while working on a machine may record a point of view of the user via a camera included in the HMD and corresponding audio of the user's environment via one or more microphones included in the HMD. Further, the user may issue voice commands for the camera to zoom-in or zoom-out. The recorded video and audio data may then be saved for review at a later time or transmitted in real-time to a remote location. However, the audio data of the user's environment may be interrupted as the user issues voice commands to the head-mounted computing device. As such, a user reviewing the recorded data may be distracted or disturbed by the voice command interruptions.

To account for this, some traditional systems may identify recognized voice commands in a recorded video and mute or delete the audio data corresponding to the recognized voice command. For example, in a video of a football game where a user issues a voice command to zoom-in a camera of a HMD, traditional systems may identify timestamps corresponding to the voice command and delete, mute or bleep out the audio data corresponding to the voice command. While this may prevent playback of the voice commands in the recorded audio data, a user reviewing the recorded data will still experience interrupted audio due to the deleted, muted, or bleeped out audio data. Moreover, by deleting, muting, or bleeping out portions of audio data, a user reviewing the recorded data may miss important information that was captured in the audio data at the same time a voice command was issued. For example, a user at a conference that is wearing a HMD may issue a voice command to zoom in on a speaker at the conference. If a segment of audio corresponding to the voice command is deleted, muted, or bleeped entirely, cross talk from the speaker may also be deleted, muted, or bleeped and, thus, be unavailable for review by another user (e.g., user reviewing the recording at a later time or a remote user viewing the recorded data in real-time). As such, many users decide to simply retain voice commands in the audio data.

SUMMARY OF THE INVENTION

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

In contrast to conventional systems, such as those described above, embodiments of the present system are generally directed to an audio scrubbing system that allows for scrubbing recognized voice commands from audio data and replacing the recognized voice commands with environment audio data. According to some examples, as a user captures video and audio data via a HMD—or other head mounted computing device—audio data captured by the HMD may be processed by an audio scrubbing module that may include a voice command recognition module to identify voice commands in the audio data that are used for controlling the HMD. When a voice command is identified in the audio data, timestamps corresponding to the voice command may be determined. This may allow for performing various actions using the audio data captured by the HMD, such as generating filler audio data to imitate the environment by processing at least a portion of the audio data (e.g., background noise prior to and/or after the identified voice command) by a neural network of a machine learning model (e.g., deep neural network (DNN), such as a convolutional neural network (CNN)). The filler audio data may then be used to replace the audio data corresponding to the identified voice commands, thereby scrubbing the voice command from the audio data. Advantageously, a user reviewing the video and audio data may hear filler audio rather than the identified voice commands.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-8 illustrate an embodiment of the present invention and in which:

DETAILED DESCRIPTION

The subject matter of the present technology is described with specificity in this disclosure to meet statutory requirements. However, this description is not intended to limit the scope hereof. Rather, the claimed subject matter may be embodied in other ways, to include different steps, combinations of steps, features, and/or combinations of features, similar to the ones described in this disclosure, in conjunction with other present or future technologies. Moreover, although the terms "step" and "block" may be used to identify different elements of methods employed, the terms should not be interpreted as implying any particular order among or between various steps or blocks unless and except when the order of individual steps or blocks is explicitly described and required.

In some embodiments of the present invention, a head mounted display (HMD) may include a voice-user interface to allow for a user to interact with the HMD. For example, a user may issue voice commands to the HMD to select a menu option, zoom-in a camera, call another user, etc. The HMD may further include a camera and a set of microphones to enable the user to capture video data and audio data. As a user captures video data and audio data via the HMD, (e.g., or head mounted computing device) audio data captured by the HMD may be processed by an audio scrubbing module configured to remove, subtract, replace and/or neutralize any detected voice commands from the audio data.

The audio scrubbing module may receive audio data at a voice command recognition module that may incorporate a language model for speech recognition where the audio data may be analyzed to generate output confidence values corresponding to voice commands. For example, a user recording a soccer game via a HMD may verbalize, "There goes my favorite player. Zoom-in." The voice command recognition module may receive the audio data corresponding to the user's speech and analyze the speech to determine whether the speech includes a voice command. The phrase "zoom-in" may be processed to determine that the user issued a command to zoom-in. Upon determining that the user issued a voice command, the voice command recognition module may determine time stamps corresponding to the start and end of the voice command.

A voice command scrubber may access the time stamps corresponding to the voice command and remove, or substantially remove, the audio data corresponding to the timestamps of the voice command. In some embodiments, the voice command scrubber may remove all audio data corresponding to the timestamps of the voice command. For example, during the time when the voice command is spoken, the audio data may be muted such that the voice command is not heard. In such embodiments, and as discussed further below, filler audio data may be generated by a neural network to replace the audio data corresponding to the timestamps of the voice command.

In some embodiments, to remove the audio data for a voice command, the audio scrubbing module may identify a voice pattern corresponding to the voice command within a portion of captured audio. In some embodiments, the identified voice pattern may then be parsed out and subtracted from the portion of captured audio, leaving only background environment audio data in the portion of captured audio. In further embodiments, the identified voice pattern may be neutralized by introducing a scrubbing voice pattern of identical frequency, but of opposite amplitude (i.e., of inverse polarity). The combination of the voice pattern corresponding to the voice command and the scrubbing voice pattern may result in silencing the voice command from the audio data while maintaining the background environment audio data. Advantageously, only voice commands are effectively removed from the audio data and audio captured in the background environment audio data may be retained.

In further embodiments of the present invention, audio data corresponding to voice commands may, additionally or alternatively, be removed from a segment of audio based on parsing a signal from two of more microphones to subtract identified voice commands from the audio data. For example, a HMD may have a directional microphone near a user's mouth and an omnidirectional microphone in one or more other locations on the HMD. When a voice command is identified, the audio scrubbing module may suppress audio data determined to have arrived via the directional microphone and retain audio data determined to have arrived via the one or more omnidirectional microphones. Additionally or alternatively, the audio scrubbing module may analyze a sound pressure level of the audio data at timestamps corresponding to the voice command captured by the two or more microphones. As the sound pressure level captured by the microphone near the user's mouth may be significantly higher than the sound pressure levels captured by the one or more other microphone(s), the audio scrubbing module may identify audio data corresponding to the user's voice based on the high sound pressure levels and cancel the audio data that have high sound pressure levels, which may effectively cancel the voice command audio data and preserve environment audio data.

In some embodiments, filler audio data may be generated to imitate a surrounding environment by processing at least a portion of the audio data (e.g., background noise prior to and/or after the identified voice command) by a neural network of a machine learning model (e.g., deep neural network (DNN), such as a convolutional neural network (CNN)). The filler audio data may then be used to replace the audio data corresponding to the identified voice commands, thereby scrubbing the voice command from the audio data. In some examples, the voice command scrubbing system may buffer the audio and video data before transmitting the audio and video data to a remote viewer. As most voice commands may be quickly spoken by a user, the buffer time may be insignificant and provide for near real-time voice command scrubbing. Advantageously, a user reviewing the video and audio data will not hear the identified voice commands.

Figure 1:
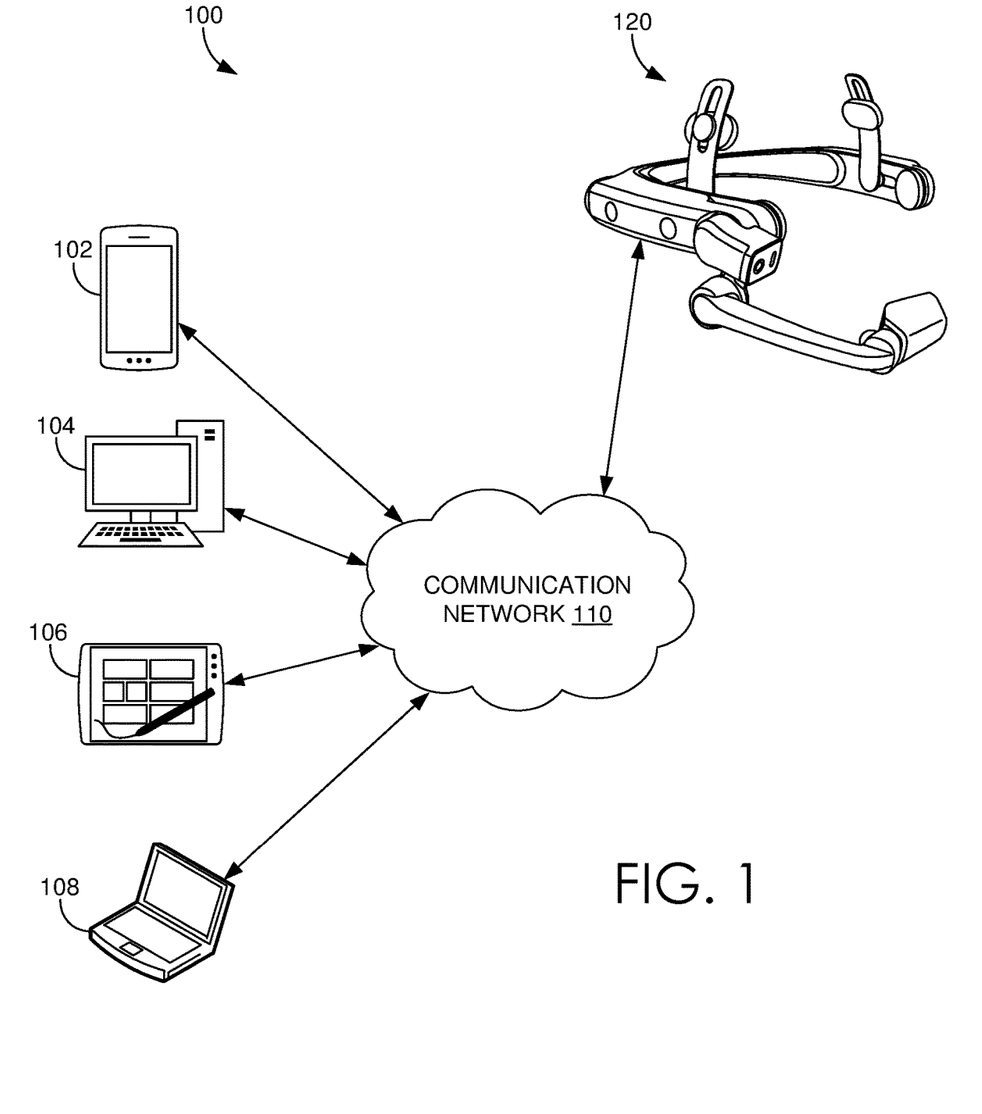
FIG. 1 illustrates a schematic diagram showing an example operating environment 100 for operating a wearable device, in accordance with an embodiment of the present disclosure.

Turning initially to FIG. 1, FIG. 1 illustrates a schematic diagram showing an example operating environment 100 for operating a wearable device in accordance with some implementations of the present disclosure. Environment 100 includes one or more wearable devices, such as but not limited to head-mounted display (HMD) device 120 and one or more user computing devices. Such user computing devices include, but are not otherwise limited to smartphone 102, desktop 104, tablet 106, and laptop 108. Various embodiments of HMD device 120 are discussed in conjunction with at least FIGS. 1-8. However, briefly here, HMD device 120 is a wearable computing device that provides computing and communication capabilities to the wearer. In the non-limiting body shown in FIG. 1, a wearable device (e.g. HMD device 120) may be worn about the head of the user. Other embodiments are not so limited. Various embodiments of user computing devices, such as computing devices 102-108 are discussed in conjunction with FIG. 8.

Environment 100 additionally includes a communication network, such as but not limited to communication network 110, which communicatively couples each of user computing devices 102-108 and HMD device 120. Communication network 110 may be any communication network, including virtually any wired and/or wireless communication technologies, wired and/or wireless communication protocols, and the like. It should be understood that communication network 110 may be virtually any network that communicatively couples at least one of user computing devices 102-108 with a wearable device, such as but not limited to HMD device 120.

Figure 2:
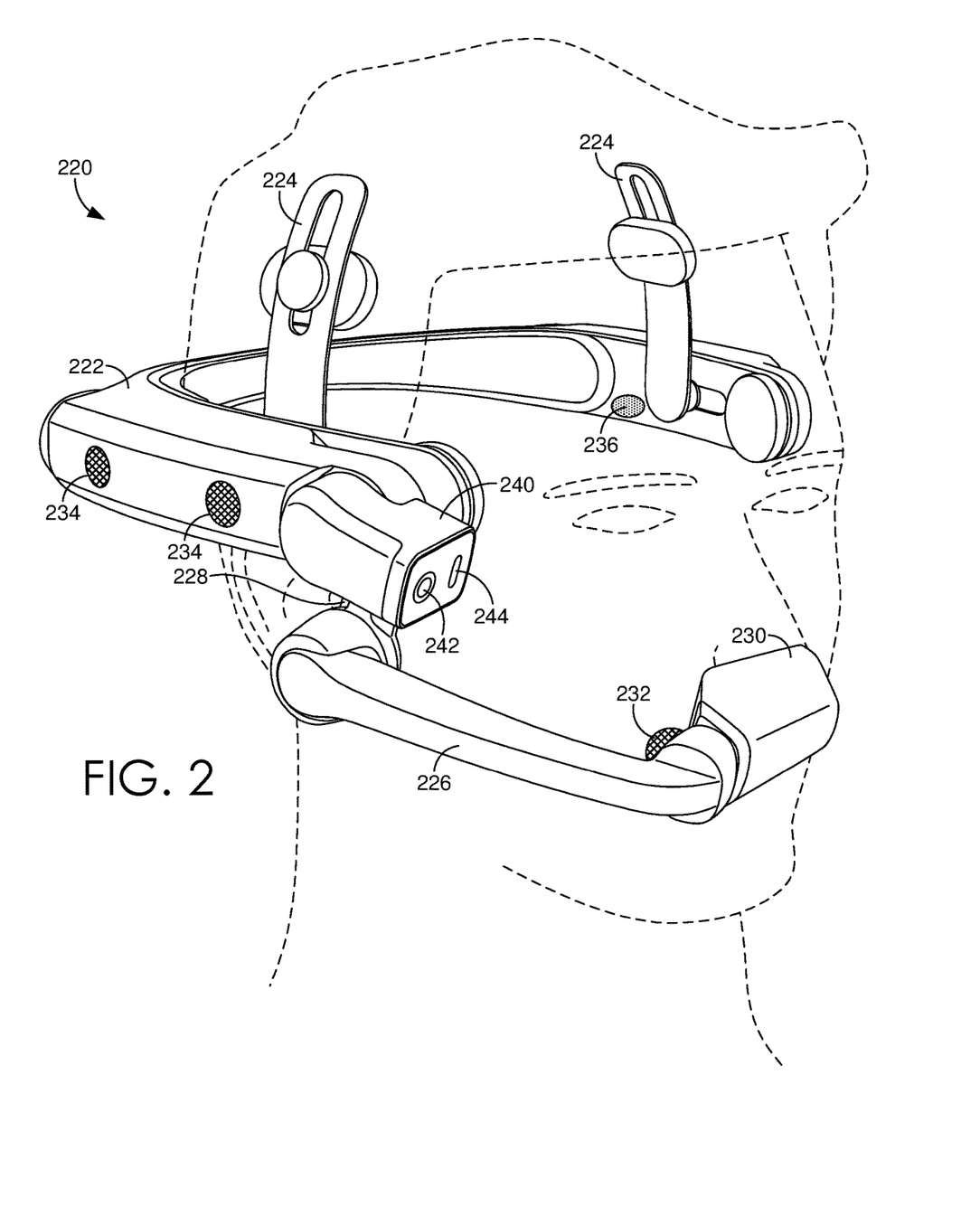
FIG. 2 illustrates an example embodiment of a HMD device, in accordance with some implementations of the present disclosure.

Turning to FIG. 2, FIG. 2 illustrates an example embodiment of a HMD device 220, in accordance with some implementations of the present disclosure. HMD device 220 is a wearable device. HMD device 220 may be similar to HMD device 120 of FIG. 1. HMD device 220 includes a frame member 222. Frame member 222 may be a frame structure. As shown in FIG. 2, frame member 222 is configured and arranged for wearing by a user. For instance, frame member 222 may be worn about the user's head. HMD device 220 may additionally include one or more stabilizing members 224 (or stabilizing structures) that stabilize the frame member 222 about the user's head.

HMD device 220 may include one or more rotating members, such as but not limited to first rotating member 226 and second rotating member 228. At least one of rotating members 226 or 228 is rotatably coupled to frame member 222, i.e. at least one of rotating members 226 or 228 is coupled to frame member and configured and arranged for rotating relative to frame member 222. In at least one embodiment, first rotating member 226 may be a boom arm that is coupled to a display module 230. Display module 230 houses a display device (not shown in FIG. 2) that is directed towards the eyes of the users. As shown in FIG. 2, the display device is within the user's line-of-sight (LOS). In some embodiments, the user may re-position the display device, via a rotation of one or more of rotating members 226/228, such that the display device is excluded from the user's LOS. Note that in the view of HMD device 220 shown in FIG. 2, the display device is occluded by external surfaces display module 230.

HMD device 220 includes various electroacoustic transducers (e.g. microphones and audio speakers). One such electro acoustical transducer 232 is located near a distal end of rotating member 226. Electroacoustic transducer 232 may be a primary microphone or set of microphones. In some embodiments primary microphone 232 may comprise at least one directional microphone that is configured such that it may detect voice commands of the user. In various embodiments, HMD device 220 includes one or more additional electroacoustic transducers, including but not limited to one or more auxiliary microphones 234 and one or more audio speakers which may be coupled to frame member 222, such as but not limited to audio speaker 236.

In some embodiments, a plurality of microphones 234 may be distributed (e.g., uniformly) on the frame member 222 to provide spatial audio detection and to aid in identifying voice commands in order to remove, subtract, replace and/or neutralize them from/in audio data. For example, a plurality of omnidirectional auxiliary microphones 234 may be distributed on the frame member 222 and a directional microphone 232 located near a distal end of rotating member 226, which may be directed at a user's mouth, may each be linked to a computing device of the HMD device 220 that may record audio signals detected via the plurality of omnidirectional auxiliary microphones 234 and the directional microphone 232. The recorded audio signals may be interpreted by the computing device of the HMD 220 into a coherent form such that audio signals from each of the omnidirectional auxiliary microphones 234 and the directional microphone 232 may be jointly processed to allow for parsing signals coming from a given direction and remove audio signals corresponding to voice commands from a user.

In further embodiments, a location of microphone 232 may be determined based on one or more position-detecting sensors and/or switches configured to detect an angle of rotating member 226. Such sensors and/or switches may include, but are not otherwise limited to Hall Effect sensors and/or Hall Effect switches. Other such sensors and/or switches may also include, but are not limited to, optical sensors that detect optical encodings, mechanical switches, capacitive sensors, conductive switches, magnetic switches, and the like. Given a known physical spatial relationship between each of the auxiliary microphones 234 and microphone 232, simultaneous DSP (digital signal processor) processing of the signals from each of the individual microphone elements may be used to create one or more "virtual" microphones. Virtual microphones with a set of virtual polar patterns may then be used to steer individual lobes of each of the set of the virtual microphone patterns to focus on and/or reject, particular sources of sound, such as a mouth of a user speaking a voice command.

Further, HMD device 220 may include an optical module 240 that houses one or more photon-detectors (e.g. camera devices), such as photon-detector 242 and a projection system 244. Projection system 244 may include one or more photon-emitters (e.g. scanning lasers, scanning light emitting diodes (LED), and the like). Optical module 240 may be configured and arranged to rotate relative to frame member 222, such that the field-of-view (FOV) of the photon-detector 242 may be rotationally varied. In at least some rotational orientations of optical module 240, the FOV of photon-detector 242 is at least similar to the FOV of the user.

Figure 3:
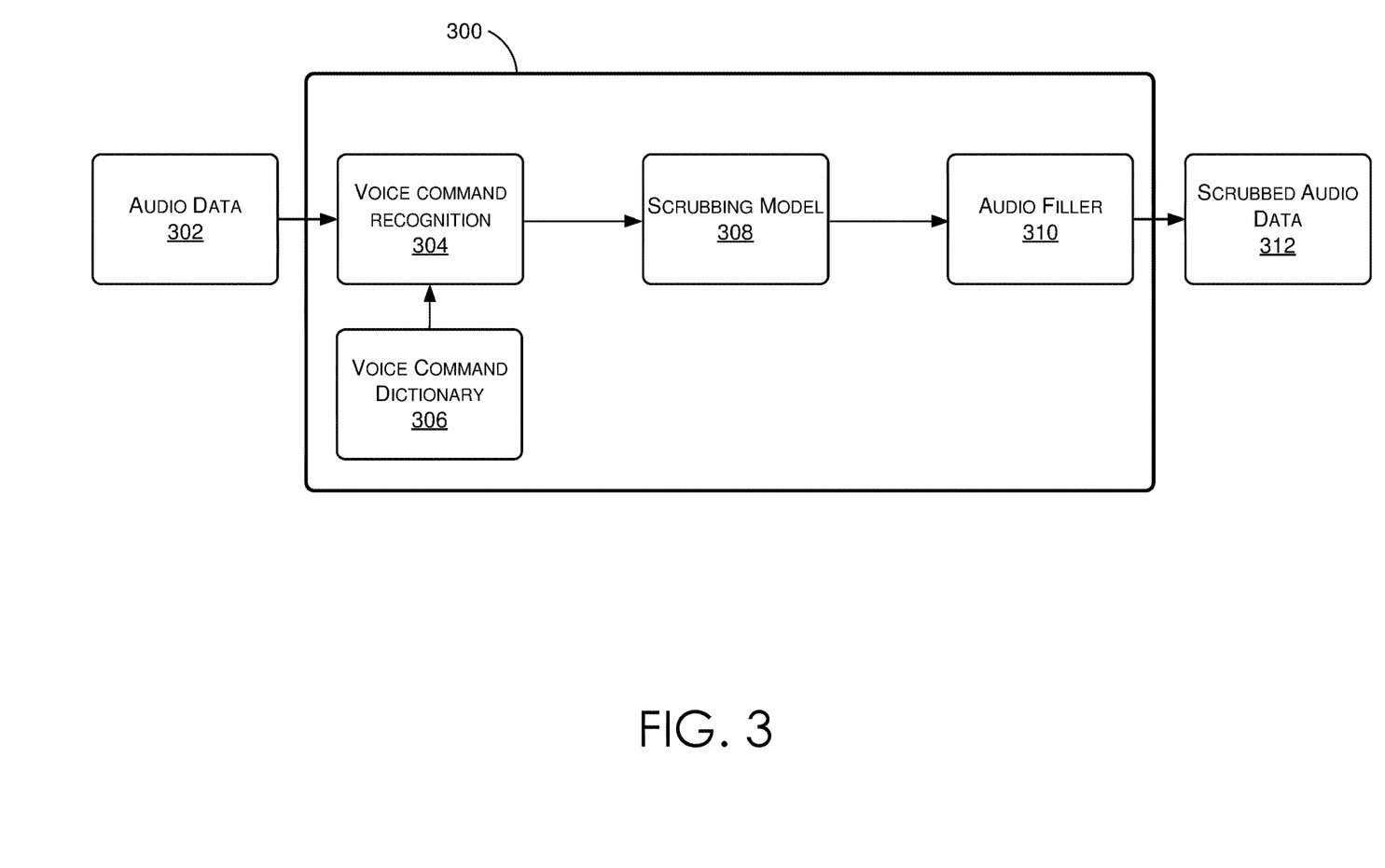
FIG. 3 illustrates an example audio scrubbing module, in accordance with embodiments of the present disclosure.

With reference to FIG. 3, FIG. 3 illustrates an example audio scrubbing module 300, in accordance with embodiments of the present invention. As an illustrative example shown in FIG. 3, the audio scrubbing module 300 may include a voice recognition module 304, a voice command dictionary 306, a scrubbing model 308, and an audio filler module 310.

In some embodiments, the audio scrubbing module 300 (e.g., audio scrubbing module 300, voice recognition module 304, voice command dictionary 306, scrubbing model 308, and audio filler module 310) may include or leverage one or more deep neural networks (DNNs). The DNNs may include any type of DNN or machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), lane detection algorithms, computer vision algorithms, and/or other types of machine learning models.

As an example, such as where the DNN includes a convolutional neural network (CNN), the DNN may include any number of layers. One or more of the layers may include an input layer. The input layer may hold values associated with the audio data 302 (e.g., before or after post-processing). One or more layers may include convolutional layers. The convolutional layers may compute the output of neurons that are connected to local regions in an input layer, each neuron computing a dot product between their weights and a small region they are connected to in the input volume. One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer. One or more of the layers may include a pooling layer. The pooling layer may perform a down sampling operation along the spatial dimensions (e.g., the height and the width), which may result in a smaller volume than the input of the pooling layer. One or more of the layers may include one or more fully connected layer(s). Each neuron in the fully connected layer(s) may be connected to each of the neurons in the previous volume. The fully connected layer may compute class scores, and the resulting volume may be 1×1× number of classes. In some examples, the CNN may include a fully connected layer(s) such that the output of one or more of the layers of the CNN may be provided as input to a fully connected layer(s) of the CNN. In some examples, one or more convolutional streams may be implemented by the DNN, and some or all of the convolutional streams may include a respective fully connected layer(s). In some non-limiting embodiments, the DNN may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the DNN, this is not intended to be limiting. For example, additional or alternative layers may be used in the DNN, such as normalization layers, SoftMax layers, and/or other layer types. In embodiments where the DNN includes a CNN, different orders and numbers of the layers of the CNN may be used depending on the embodiment. In other words, the order and number of layers of the DNN is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the DNN during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

In operation, as seen in FIG. 3, the audio scrubbing module 300 may receive audio data 302 that is captured via a set of microphones (e.g., 232 and 234) on the HMD device 220. For example, as a user is operating the HMD device 220, the user's speech may be captured by an application (not shown) of the HMD device 220 via the set of microphones. In some embodiments, audio data may be captured by a directional microphone 232 when a boom arm that includes the directional microphone 232 is rotated such that it is positioned in front of the user. For example, based on determining that the boom arm is rotated into a first position in front of the user, the application of the HMD device 220 may activate the directional microphone 232 to capture audio data and detect voice commands for scrubbing. Conversely, based on determining that the boom arm is rotated into a second position away from the user's mouth, the application of the HMD device 220 may deactivate the directional microphone 232 and only capture audio data via a set of microphones 234 included in the frame member 222.

The captured audio data 302 may then be passed to the voice command recognition module 304, which may include a language model (not shown), where the audio data 302 may be analyzed to generate output confidence values corresponding to voice commands. When the confidence value corresponding to a voice command exceeds a threshold value, the voice command may be determined to be a valid voice command. Upon determining a valid voice command, timestamps corresponding to the start and end of the voice command may be determined.

In some embodiments, the language model may output confidence values for individual words, which may be compared to a word list in the voice command dictionary 306. For example, the DNN may output confidence values corresponding to any number of words, and the word with a highest confidence may be determined as the word corresponding to the speech for the given instance of the DNN (e.g., corresponding to a time step). As such, as a user is speaking, a language model of the voice command recognition module 304 may output confidence values corresponding to a set of predicted words the DNN is trained to predict. In further embodiments, prior to being applied to the language model, the audio data 302 may be converted to an appropriate format for the DNN of the language model to process. For example, the audio data may be converted to a monotone format with a specific audio frequency in order to allow the language model to effectively process the audio data 302 and compute accurate predictions. Identified words or phrases may be compared against one or more voice command dictionaries 306 (or word lists) containing voice commands. When an identified word or phrase is found in the voice command dictionary 306, the identified word or phrase may be classified as a voice command and timestamps corresponding to the start and end of the voice command may be determined.

Scrubbing model 308 may access the determined timestamps to remove, or substantially remove, a portion of the audio data 302 corresponding to the determined voice command (i.e., the voice command audio). In some embodiments, the scrubbing model 308 may remove all captured audio data at timestamps corresponding to the voice command audio. For example, the scrubbing model 308 may access the timestamps corresponding to an identified voice command and mute the audio data between the timestamps corresponding to an identified voice command.

In some embodiments, to remove the voice command audio, the scrubbing model 308 may identify a voice pattern corresponding to the voice command audio. For example, the scrubbing model 308 may determine a voice pattern corresponding to the voice command audio by accessing a stored voice pattern and/or scrubbing voice pattern corresponding to a prior recording of the user issuing the voice command. Additionally or alternatively, the scrubbing model 308 may determine a voice pattern corresponding to the voice command audio in real-time by parsing a signal from two of more microphones to identify a signal corresponding to the voice command. For example, the scrubbing model 308 may parse signals coming from different directions by jointly processing audio signals from a plurality of microphones to isolate audio signals that include the voice command audio. Further, user voice recognition characteristics (e.g., a user vocal fingerprint) may be stored to aid in identifying audio signals corresponding to voice commands from a given user. The identified voice pattern corresponding to the voice command audio may then be subtracted from the audio data, leaving only background environment audio data. Additionally or alternatively, the voice pattern corresponding to the voice command audio may neutralized by introducing a scrubbing voice pattern of identical frequency, but of opposite amplitude (i.e., of inverse polarity). The combination of the voice pattern corresponding to the voice command and the scrubbing voice pattern may result in silencing the voice command from the audio data while maintaining background environment audio data.

In further embodiments of the present invention, voice command audio may be removed from a segment of audio by parsing a signal from two of more microphones to remove identified voice commands from the audio data 302. For example, when a voice command is identified, the scrubbing model 308 may suppress audio data between the identified timestamps corresponding to the voice command that is determined to have been captured via a directional microphone directed at a user's mouth (e.g., directional microphone 232 located near a distal end of rotating member 226) and retain audio data determined to have arrived via one or more omnidirectional microphones (e.g., a plurality of omnidirectional auxiliary microphones 234 distributed on the frame member 222). Additionally or alternatively, the scrubbing model 308 may remove voice command audio from a segment of audio data 302 by analyzing sound pressure levels of the audio data 302 captured by a plurality of microphones 232 and 234 at timestamps corresponding to the voice command audio. For example, as the sound pressure level captured via microphone 232, which is near the user's mouth, may be significantly higher than sound pressure levels captured by microphones 234, which are included in the frame member 222, the scrubbing model 308 may selectively remove audio data captured via one or more microphones based on sound pressure levels at timestamps corresponding to the voice command audio. Further, to enhance the quality of the voice command removal, the scrubbing model 308 may utilize any combination of methods described herein. For example, the scrubbing model 302 may parse audio signals received from two or more microphones and subtract audio signals received via microphones near a user's mouth, and may also introduce a scrubbing voice pattern to neutralize a voice pattern corresponding to a voice command.

Audio filler module 310 may generate audio data to imitate a surrounding environment by sampling audio data before and after a voice command. For example, audio filler module 310 may include or leverage a DNN that may process portions of audio data 302 prior to and after the timestamp corresponding to the voice command to extract features of the audio data 302 prior to and after the voice command is determined. The DNN may then synthesize the extracted features of the audio data 302 to generate artificial audio data of the same duration as the determined voice command (i.e., filler audio data). Filler audio data may then be embedded in the audio data 302 between the timestamps corresponding to the determined voice command to generate scrubbed audio data 312. The scrubbed audio data 312 may then be stored by the HMD device 220 or transmitted to a remote device via communication network 110.

In some embodiments, the audio scrubbing module 300 may leverage parsed audio data that is captured via a set of microphones that are positioned away from the user's mouth as a ground truth for comparing filler audio data to environment data. As such, a loss function of a loss layer of a DNN of the scrubbing module 300 that may be included in the audio filler module 310 may output values corresponding to the quality of predicted filler audio data. These output values may then be backpropagated to further train the DNN. Further, the DNN may constantly sample environmental audio data to maintain an understanding of the background audio data of an environment.

Figure 4:
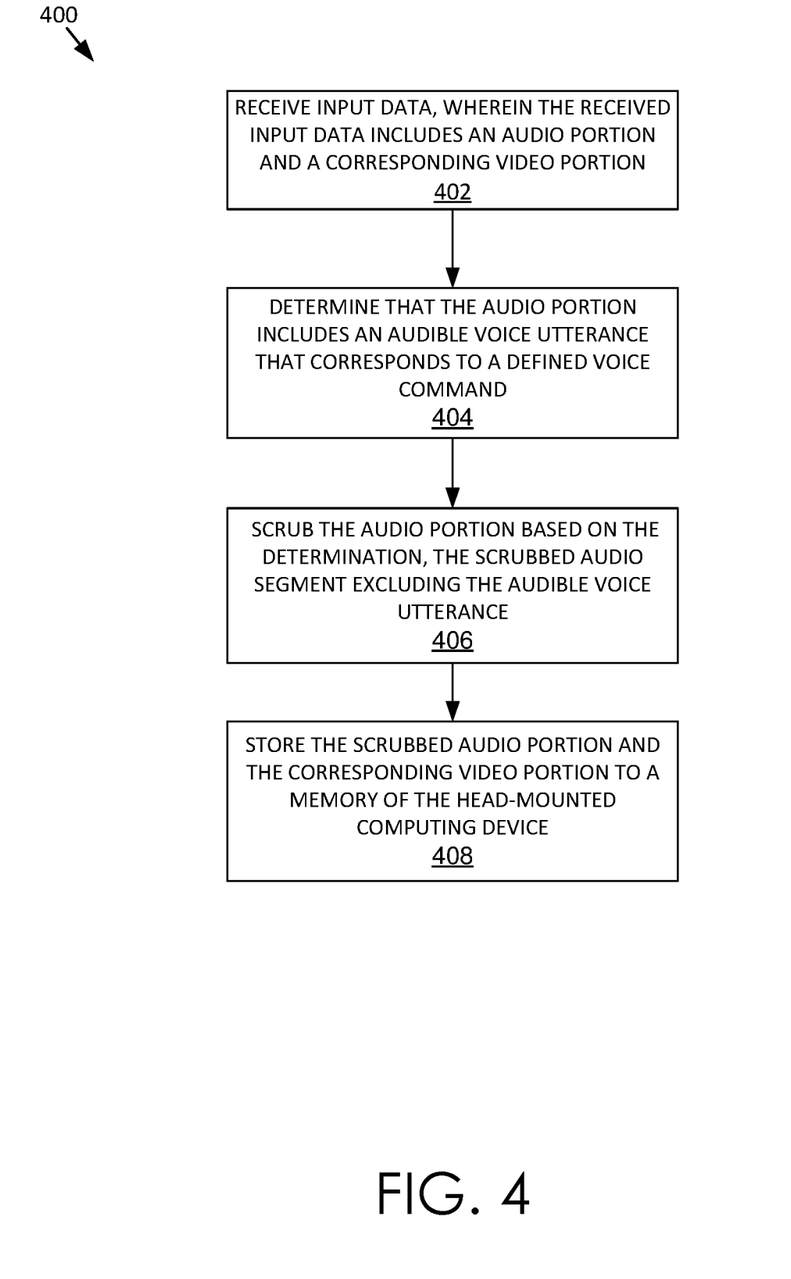
FIG. 4 is a flow diagram showing a method for scrubbing an audio portion of input data, in accordance with embodiments described herein.
Figure 5:
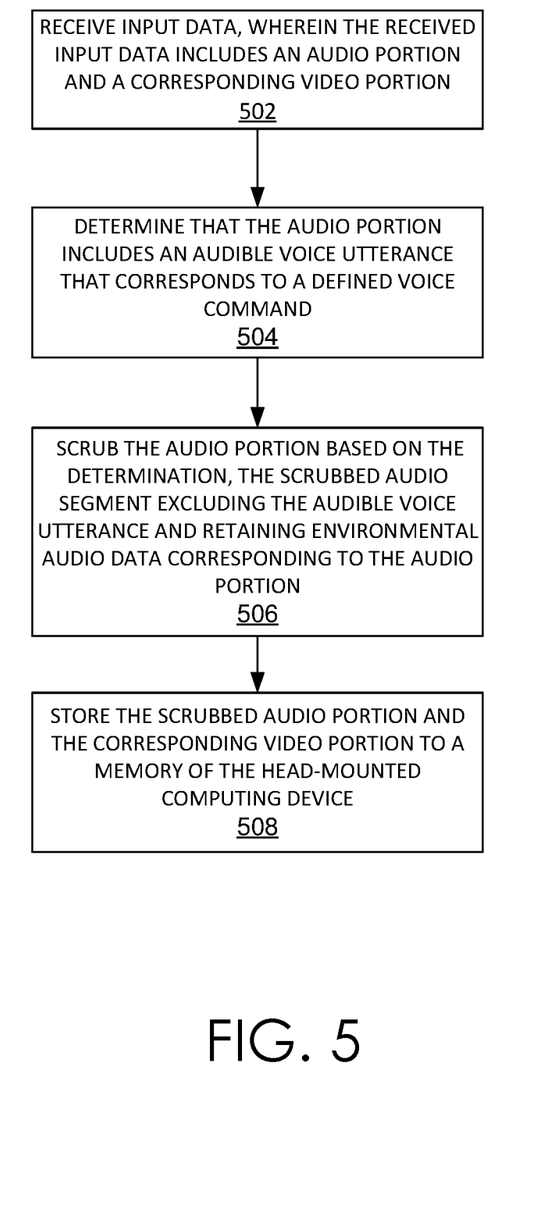
FIG. 5 is a flow diagram showing a method for scrubbing an audio portion of input data, in accordance with embodiments described herein.
Figure 6:
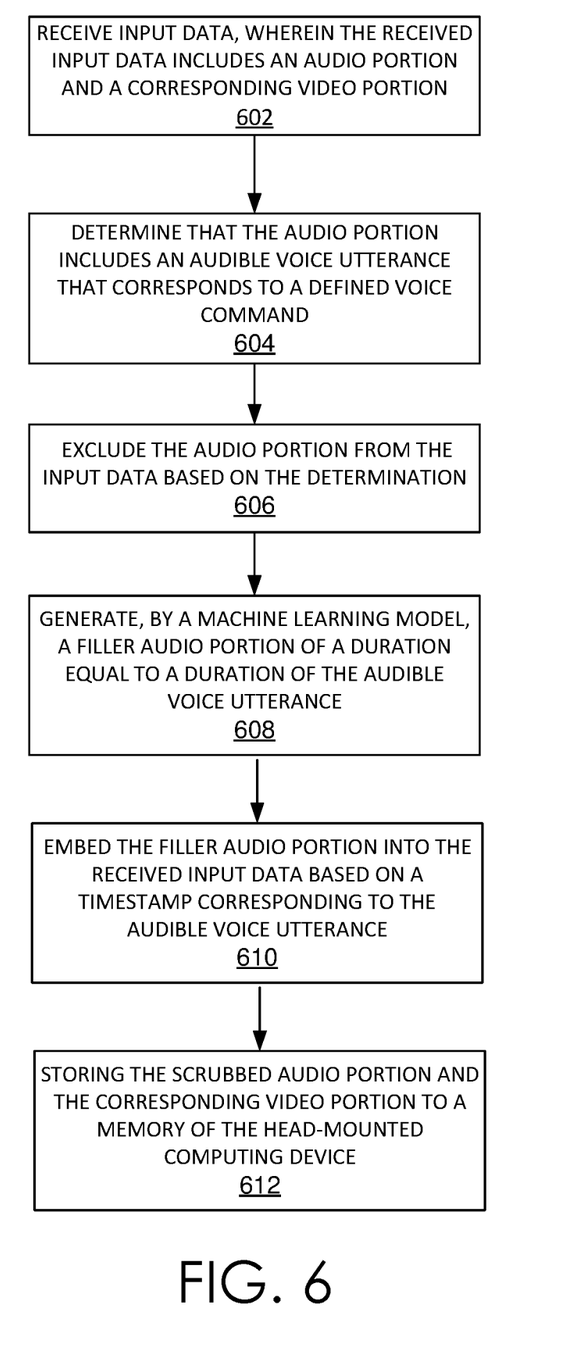
FIG. 6 is a flow diagram showing a method for excluding an audio portion of input data and generating a filler audio portion of data, in accordance with embodiments described herein.

With reference to FIGS. 4, 5 and 6, flow diagrams are provided illustrating methods 400, 500, and 600 for scrubbing an audio portion of input data that includes an audible voice utterance corresponding to a defined voice command, in accordance with embodiments of the present invention.

Each block of methods 400, 500, and 600, and any other methods described herein, comprise a computing process performed using any combination of hardware, firmware, and/or software. For instance, various functions can be carried out by a processor executing instructions stored in memory. The methods can also be embodied as computer-usable instructions stored on non-transitory computer storage media. The methods can be provided by a standalone application, a service or hosted service (standalone or in combination with another hosted service), or a plug-in to another product, to name a few. The methods 400, 500, and 600 may be implemented by the operating environment 100 as described in conjunction with FIGS. 1-8.

Turning to FIG. 4, FIG. 4 illustrates method 400 in accordance with embodiments described herein. Initially at block 402, input data is received, wherein the received input data includes an audio portion. At block 404, it is determined that the audio portion includes an audible voice utterance that corresponds to a defined voice command. At block 406, the audio portion is scrubbed based on the determination, the scrubbed audio segment excluding the audible voice utterance. At block 408, the scrubbed audio portion and the corresponding video portion are stored to a memory of the head-mounted computing device.

Turning to FIG. 5, FIG. 5 illustrates method 500 in accordance with embodiments described herein. Initially at block 502, input data is received, wherein the received input data includes an audio portion. At block 504, it is determined that the audio portion includes an audible voice utterance that corresponds to a defined voice command. At block 506, the audio portion is scrubbed based on the determination, the scrubbed audio segment excluding the audible voice utterance and retaining environmental audio data corresponding to the audio portion. At block 508, the scrubbed audio portion and the corresponding video portion are stored to a memory of the head-mounted computing device.

Turning to FIG. 6, FIG. 6 illustrates method 600 in accordance with embodiments described herein. Initially at block 602, input data is received, wherein the received input data includes an audio portion. At block 604, it is determined that the audio portion includes an audible voice utterance that corresponds to a defined voice command. At block 606, the audio portion from the input data is excluded based on the determination. At block 608, a filler audio portion of a duration equal to a duration of the audible voice utterance is generated by a machine learning model. At block 610, the filler audio portion is embedded into the received input data based on a timestamp corresponding to the audible voice utterance. At block 612, the scrubbed audio portion and the corresponding video portion are stored to a memory of the head-mounted computing device.

Having described embodiments of the present invention, an example operating environment in which embodiments of the present invention may be implemented is described below in order to provide a general context for various aspects of the present invention.

Figure 7:
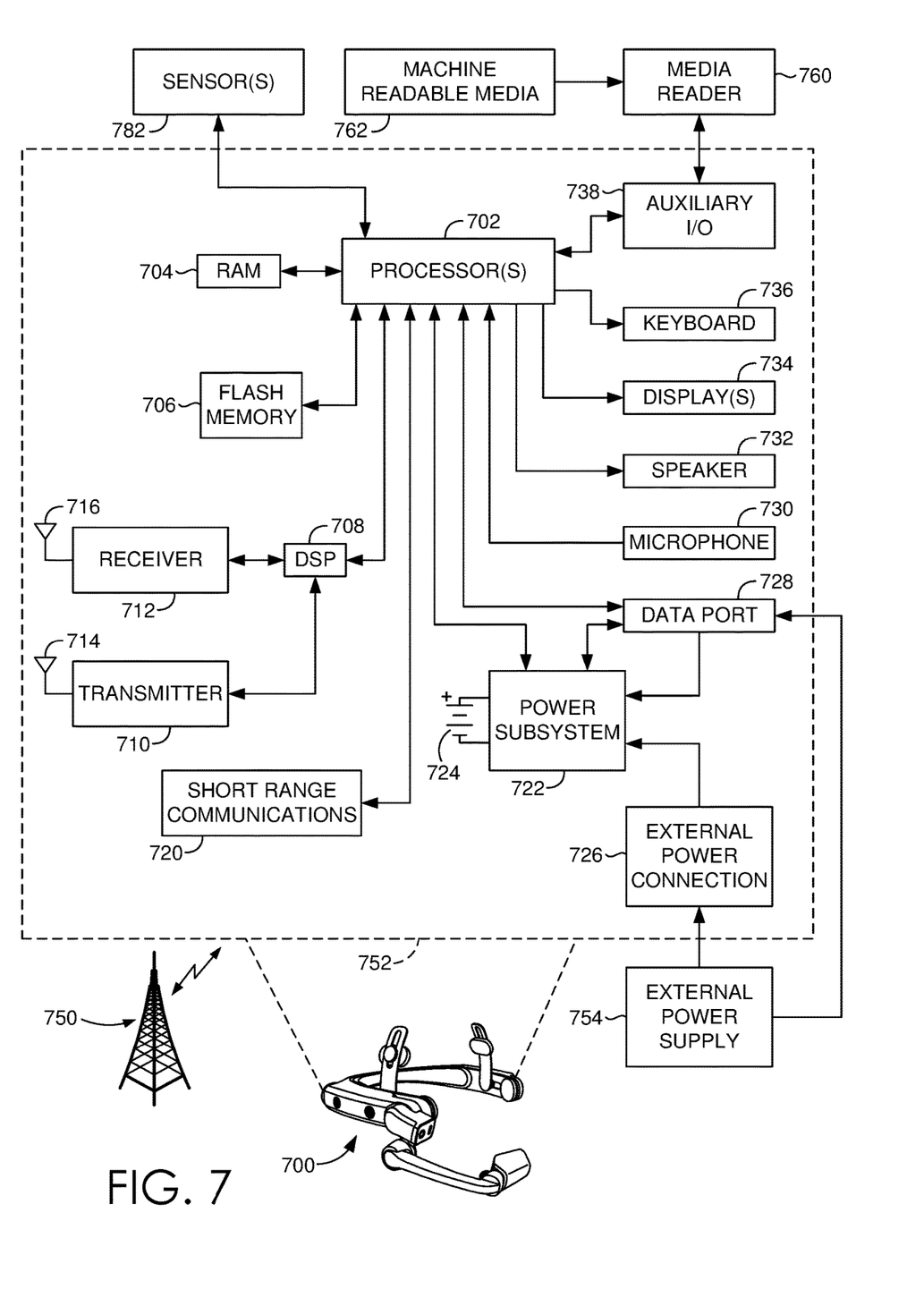
FIG. 7 provides a block diagram of an exemplary wearable platform in which some implementations of the present disclosure may be employed.

FIG. 7 provides a block diagram of an exemplary wearable device 700 in which some implementations of the present disclosure may be employed. Any of the various embodiments of wearable devices discussed herein, including but not limited to wearable platform 100 of FIGS. 1A-1B, may include similar features, components, modules, operations, and the like as wearable device 700. In this example, wearable device 700 may be enabled for wireless two-way communication device with voice and data communication capabilities. Such wearable devices communicate with a wireless voice or data network 750 using a suitable wireless communications protocol. Wireless voice communications are performed using either an analog or digital wireless communication channel. Data communications allow the wearable platform 700 to communicate with other computer systems via the Internet. Examples of wearable platforms that are able to incorporate the above described systems and methods include, for example, a data messaging device, a two-way pager, a cellular telephone with data messaging capabilities, a wireless Internet appliance or a data communication device that may or may not include telephony capabilities.

The illustrated wearable platform 700 is an example wearable platform configuration that includes two-way wireless communications functions. Such wearable platforms incorporate communication subsystem elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the communication network and associated wireless communications protocols with which the device is intended to operate.

The wearable platform 700 includes a microprocessor 702 that controls the overall operation of the wearable platform 700. The microprocessor 702 interacts with the above described communications subsystem elements and also interacts with other device subsystems such as flash memory 706, random access memory (RAM) 704, auxiliary input/output (I/O) device 738, data port 728, display 734, keyboard 736, speaker 732, microphone(s) 730, a short-range communications subsystem 720, a power subsystem 722, and any other device subsystems.

A battery 724 is connected to a power subsystem 722 to provide power to the circuits of the wearable device 700. The power subsystem 722 includes power distribution circuitry for providing power to the wearable device 700 and also contains battery charging circuitry to manage recharging the battery 724. The power subsystem 722 includes a battery monitoring circuit that is operable to provide a status of one or more battery status indicators, such as remaining capacity, temperature, voltage, electrical current consumption, and the like, to various components of the wearable platform 700, as well as to any peripheral devices connected to the wearable platform 700.

The data port 728 is able to support data communications between the wearable platform 700 and other devices through various modes of data communications, such as high speed data transfers over an optical communications circuits or over electrical data communications circuits such as a USB connection incorporated into the data port 728 of some examples. Data port 728 is able to support communications with, for example, an external computer, peripheral device, or other device.

Data communication through data port 728 enables a user to set preferences through an external device or through a software application and extends the capabilities of the device by enabling information or software exchange through direct connections between the wearable platform 700 and external data sources rather than via a wireless data communication network. In addition to data communication, the data port 728 may provide power to the power subsystem 722 to charge the battery 724 or to supply power to the electronic circuits, such as microprocessor 702, of the wearable platform 700.

Operating system software used by the microprocessor 702 may be stored in flash memory 706. Further examples are able to use a battery backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704.

The microprocessor 702, in addition to its operating system functions, is able to execute software applications on the wearable platform 700. A predetermined set of applications that control basic device operations, including at least data and voice communication applications, is able to be installed on the wearable platform 700 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the wearable platform 700 through, for example, the wireless network 750, an auxiliary I/O device 738, Data port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided to the microprocessor 702, which is able to further process the received data for output to the display 734, or alternatively, to an auxiliary I/O device 738 or the data port 728. A user of the wearable platform 700 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the wearable platform 700 is substantially similar, except that received signals are generally provided to a speaker 732 and signals for transmission are generally produced by a microphone 730. Alternative voice or audio I/O subsystems, such as a voice message recording subsystem, may also be implemented on the wearable platform 700. Although voice or audio signal output is generally accomplished primarily through the speaker 732, the display 734 may also be used to provide an indication of the identity of a calling party, the duration of a voice call, or other voice call related information, for example.

Depending on conditions or statuses of the wearable platform 700, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 720 provides for data communication between the wearable platform 700 and different systems or devices, which need not necessarily be similar devices. For example, the short-range communications subsystem 720 includes an infrared device and associated circuits and components or a Radio Frequency based communication module such as one supporting Bluetooth® communications, to provide for communication with similarly-enabled systems and devices, including the data file transfer communications described above.

A media reader 760 connectable to an auxiliary I/O device 738 to allow, for example, loading computer readable program code of a computer program product into the wearable platform 700 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the wearable device through the data port 728 or computer readable program code is alternatively able to be provided to the wearable device 700 through the wireless network 750.

Figure 8:
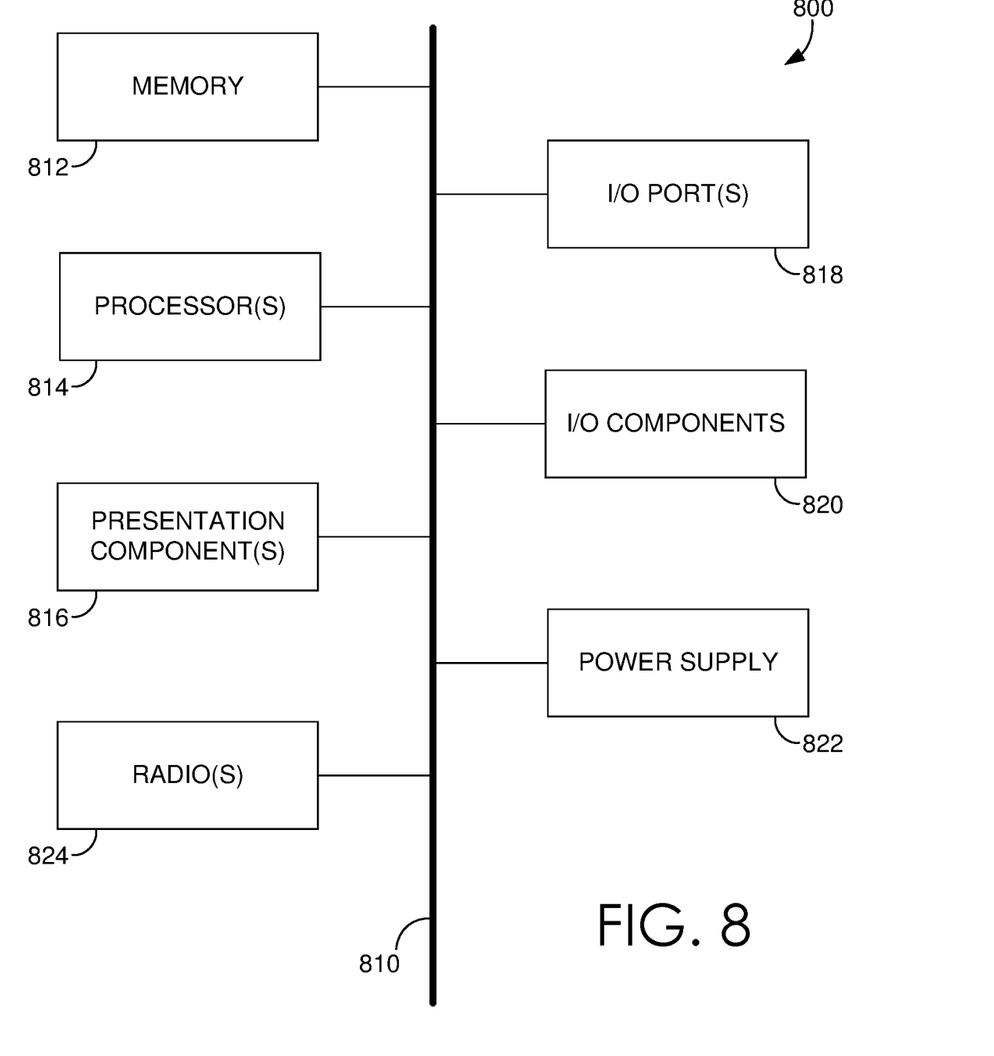
FIG. 8 provides a block diagram of an exemplary computing device in which some implementations of the present disclosure may be employed.

FIG. 8 provides a block diagram of an exemplary computing device 800 in which some implementations of the present disclosure may be employed. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated. Any computing device discussed herein, such as but not limited to user computing devices 102-108 of FIG. 1, or any of the wearable devices discussed herein, may include similar operations, features, components, modules, and the like, as included in computing device 800.

The invention may be described in the general context of computer code or machine-useable instructions, including computer-executable instructions such as program modules, being executed by a computer or other machine, such as a personal data assistant or another handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and another wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or another device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Many variations can be made to the illustrated embodiments of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and sub-combinations are of utility and may be employed without reference to other features and sub-combinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A head-mounted computing device comprising:
   a microphone;
   one or more processors;
   one or more memory devices storing programmable instructions thereon that, when executed by the one or more processors, cause the one or more processors to execute operations including:
   receiving input data, wherein the received input data includes a recorded audio portion;
   determining that the recorded audio portion includes an audible voice utterance that corresponds to a defined voice command, wherein the audible voice utterance has a first duration;
   generating, via a machine learning model, a filler audio portion based on audio segments sampled from the recorded audio portion prior to and after the audible voice utterance, the filler audio portion having a second duration equal to the first duration and excluding the audible voice utterance; and
   scrubbing the recorded audio portion based on the generated filler audio portion, the scrubbed recorded audio portion excluding the audible voice utterance.

2. The device of claim 1, wherein scrubbing the audio portion further comprises identifying a voice pattern corresponding to the audible voice utterance.

3. The device of claim 2, further comprising neutralizing the audible voice utterance that corresponds to the defined voice command based on combining a scrubbing voice pattern with the voice pattern corresponding to the audible voice utterance.

4. The device of claim 1, further comprising a plurality of microphones; and
   wherein scrubbing the audio portion further comprises parsing a set of audio signals from a plurality of microphones, wherein audio signals determined to be near a user mouth are muted.

5. The device of claim 1, wherein based on determining that a boom arm of the device is rotated into a first position, activating, by an application of the device, a directional microphone configured to capture speech from a user wearing the device.

6. The device of claim 1, further comprising identifying a portion of audio data corresponding to the defined voice command based on stored voice recognition characteristics.

7. The device of claim 1, further comprising storing the scrubbed recorded audio portion including the filler audio portion and the recorded corresponding video portion to a memory of the head-mounted computing device.

8. A non-transitory computer storage medium storing computer-useable instructions that, when used by one or more computing devices, cause the one or more computing devices to perform operations comprising:
   receiving input data, wherein the received input data includes a recorded audio portion and a recorded corresponding video portion;
   determining that the recorded audio portion includes an audible voice utterance that corresponds to a defined voice command, wherein the audible voice utterance has a first duration; and
   generating, via a machine learning model, a filler audio portion based on audio segments sampled from the recorded audio portion prior to and after the audible voice utterance, the filler audio portion having a second duration equal to the first duration and excluding the audible voice utterance.

9. The computer storage medium of claim 8, further comprising scrubbing the recorded audio portion based on the generated filler audio portion, the scrubbed recorded audio portion excluding the audible voice utterance and retaining environmental audio data corresponding to the audio portion.

10. The computer storage medium of claim 9, wherein scrubbing the audio portion further comprises identifying a voice pattern corresponding to the audible voice utterance.

11. The computer storage medium of claim 10, further comprising neutralizing the audible voice utterance that corresponds to the defined voice command based on combining a scrubbing voice pattern with the voice pattern corresponding to the audible voice utterance.

12. The computer storage medium of claim 8, wherein scrubbing the audio portion further comprises parsing a set of audio signals from a plurality of microphones, wherein audio signals determined to be near a user mouth are muted.

13. The computer storage medium of claim 8, wherein based on determining that a boom arm of the device is rotated into a first position, activating, by an application of the device, a directional microphone configured to capture speech from a user wearing the device.

14. The computer storage medium of claim 8, further comprising identifying a portion of audio data corresponding to the defined voice command based on stored voice recognition characteristics.

15. A computer-implemented method comprising:
    receiving input data, wherein the received input data includes an audio portion and a corresponding video portion;
    determining that the audio portion includes an audible voice utterance that corresponds to a defined voice command;
    excluding the audio portion from the input data based on the determination;
    generating, by a machine learning model, a filler audio portion of a duration equal to a duration of the audible voice utterance and excluding the audible voice utterance; and
    embedding the filler audio portion into the received input data based on a timestamp corresponding to the audible voice utterance.

16. The computer-implemented method of claim 15, further comprising storing the scrubbed recorded audio portion including the filler audio portion and the recorded corresponding video portion to a memory of the head-mounted computing device.

17. The computer-implemented method of claim 15, wherein excluding the audio portion further comprises identifying a voice pattern corresponding to the audible voice utterance.

18. The computer-implemented method of claim 17, further comprising neutralizing the audible voice utterance that corresponds to the defined voice command based on combining a scrubbing voice pattern with the voice pattern corresponding to the audible voice utterance.

19. The computer-implemented method of claim 15, wherein excluding the audio portion further comprises parsing a set of audio signals from a plurality of microphones, wherein audio signals determined to be near a user mouth are muted.

20. The computer-implemented method of claim 15, further comprising:
    wherein based on determining that a boom arm of the device is rotated into a first position, activating, by an application of the device, a directional microphone configured to capture speech from a user wearing the device.

* * * * *